United States Patent
Kemppainen et al.

(10) Patent No.: US 7,394,880 B2
(45) Date of Patent: Jul. 1, 2008

(54) METHOD AND APPARATUS FOR SIMULATING RADIO CHANNEL

(75) Inventors: Juha Kemppainen, Oulu (FI); Torsti Poutanen, Salo (FI); Jussi Harju, Bubikon (CH)

(73) Assignee: JOT Automation Oy, Oulunsalo (FI)

( * ) Notice: Subject to any disclaimer, the term of this patent is extended or adjusted under 35 U.S.C. 154(b) by 660 days.

(21) Appl. No.: 10/853,789

(22) Filed: May 25, 2004

(65) Prior Publication Data

US 2005/0008109 A1    Jan. 13, 2005

Related U.S. Application Data

(63) Continuation of application No. PCT/FI02/00953, filed on Nov. 26, 2002.

(30) Foreign Application Priority Data

Nov. 27, 2001   (FI) .................................. 20012319

(51) Int. Cl.
*H04B 1/10*   (2006.01)
(52) U.S. Cl. .................. 375/350; 375/220; 375/224; 375/284; 375/285; 375/296; 455/113; 455/102; 455/118; 455/120; 455/125
(58) Field of Classification Search ................ 375/350, 375/200; 370/252; 455/50.1, 446, 125; 600/447
See application file for complete search history.

(56) References Cited

U.S. PATENT DOCUMENTS

| | | | | |
|---|---|---|---|---|
| 5,596,570 A | * | 1/1997 | Soliman | 370/252 |
| 6,058,261 A | * | 5/2000 | Rapeli | 703/6 |
| 6,308,072 B1 | * | 10/2001 | Labedz et al. | 455/448 |
| 6,600,926 B1 | * | 7/2003 | Widell et al. | 455/446 |
| 2001/0051772 A1 | * | 12/2001 | Bae | 600/447 |
| 2002/0039383 A1 | * | 4/2002 | Zhu et al. | 375/214 |

FOREIGN PATENT DOCUMENTS

| | | |
|---|---|---|
| WO | WO 93/20626 | 10/1993 |
| WO | WO 99/21305 | 4/1999 |
| WO | WO 01/17301 A1 | 3/2001 |

* cited by examiner

*Primary Examiner*—Shuwang Liu
*Assistant Examiner*—Kabir A Timory
(74) *Attorney, Agent, or Firm*—Hoffmann & Baron, LLP

(57) ABSTRACT

A radio channel simulator configured to read radio channel data describing a radio channel and user data including at least one user signal, and to simulate the radio channel using a FIR filter comprising one or more FIR blocks for filtering the user data read based on radio channel data in connection with the simulation. The radio channel simulator is configured to transfer at least one FIR block at a delay level depicting a radio channel delay during simulation.

6 Claims, 5 Drawing Sheets

METHOD AND APPARATUS FOR SIMULATING RADIO CHANNEL

This application is a Continuation of International Application PCT/FI02/00953 filed Nov. 26, 2002 which designated the U.S. and was published under PCT Article 21 (2) in English, and claims priority to Finnish Application No. 20012319, filed on Nov. 27, 2001.

FIELD OF THE INVENTION

The invention relates to a method and an apparatus for implementing the method for simulating a radio channel. The invention relates in particular to allocating apparatus resources in a situation associated with a changing channel.

BACKGROUND OF THE INVENTION

An essential problem in radio systems is the rapid variation of radio channel properties as a function of time. This concerns for example mobile systems, in which at least one of the parties involved in a connection is often mobile. Thus, the impulse response of the radio channel varies within a wide phase and amplitude range, up to thousands times a second. This phenomenon is random by nature, and can therefore be mathematically described using statistical means. In addition, changing distances causes varying delays to the impulse responses. Such phenomena complicate the design of radio connections and the apparatuses to be used.

There are many reasons for the variation of a radio channel. When transmitting a radio frequency signal from a transmitter to a receiver on a radio channel, the signal propagates along one or more paths, in each one of which the phase and amplitude of the signal vary, thus causing fades of different lengths and strengths to the signal. In addition, noise and interference from other transmitters also disturb the radio connection as well as the changing distances.

A radio channel can be tested in either actual conditions or using a simulator that simulate actual conditions. Tests conducted in actual conditions are difficult, since tests being carried out outdoors, for instance, are affected for example by the constantly changing weather and season. Even measurements carried out in the same place provide different results at different instants of time. In addition, a test conducted in a particular environment, such as a city, does not fully apply to a test conducted in another city. In general, the worst possible situation cannot either be tested in actual conditions.

FIGS. 1A and 1B show an impulse response pattern of a radio channel at two different instants of time. In the Figures, x-axis describes the delay of the signal components and y-axis depicts the amplitude, or energy, of the signals. The Figures also illustrate that the number of impulse response taps, the delays and energies vary as a function of time as a result of the changes occurring on the radio channel, and even though minor differences are found between FIGS. 1A and 1B, a fairly static channel is concerned. The coordinates in FIG. 1C, in turn, show the mean energy of the impulse responses formed at different instants of time. FIGS. 1A and 1B show that several impulse responses are used when calculating the mean energy. FIG. 1C illustrates the allocation of FIR blocks 100A to 100C in a FIR filter (Finite Impulse Response) to be used when forming an impulse response in relation to a delay axis. In prior art allocation is carried out by analysing the energy mean in advance, and by covering all significant energy components with FIR blocks in the actual simulation.

FIGS. 2A to 2B illustrate the impulse responses at two different instants of time. FIGS. 2A and 2B show what is known as a sliding tap caused by a large reflecting change in the terrain affecting the radio connection, for instance, and by a terminal, such as a mobile phone, diverging in relation to a particular location in the terrain. FIG. 2C illustrates the energy mean as a function of time. The Figure shows that the sliding tap is illustrated as a low energy level within a wide delay range in an average energy pattern. In order to cover the entire energy distribution on the delay axis, FIR blocks 100A to 100F are correspondingly allocated in accordance with the prior art over the entire delay range.

A significant drawback associated with prior art allocation is that the apparatus resources must be allocated in vain when particular channel models are concerned. An example of such a channel model is the sliding tap channel model.

SUMMARY OF THE INVENTION

It is an object of the invention to provide a method and an apparatus for implementing the method so as to optimally utilize apparatus resources in various channel model situations. This is achieved with a method for simulating a radio channel comprising simulating the radio channel utilizing user data describing radio signal and radio channel data describing the radio channel at different instants of time, and the simulation filtering the user data using one or more FIR blocks in a FIR filter based on the radio channel data. In this method, at least one of the FIR blocks is transferred at a delay level depicting a radio channel delay during simulation.

The invention also relates to a radio channel simulator comprising means for reading radio channel data describing a radio channel and user data including at least one user signal, and a FIR filter for simulating the radio channel, the FIR filter comprising one or more FIR blocks for filtering the user data read based on the radio channel data in connection with the simulation. The radio channel simulator comprises allocation means for allocating said one or more FIR blocks for filtering purposes, the allocation means being arranged to transfer at least one FIR block at a delay level depicting a radio channel delay during simulation.

The invention further relates to a radio channel simulator that is configured to read radio channel data describing a radio channel and user data including at least one user signal, and to simulate the radio channel using a FIR filter comprising one or more FIR blocks for filtering the user data read based on the radio channel data in connection with the simulation. The radio channel simulator is configured to transfer at least one FIR block at a delay level depicting a radio channel delay during simulation.

The preferred embodiments of the invention are disclosed in the dependent claims.

The invention relates to radio channel simulators, in which user data depicting radio signal is read into a simulator as well as radio channel data depicting a radio channel. What simulation refers to in the specification of the invention is a simulation session, during which particular radio channel data is fed into FIR blocks in order to filter user data.

The invention is based on the idea that FIR blocks are dynamically allocated when simulating a radio channel, whereby only a required number of blocks is allocated. In such a case, the unnecessary blocks can be released, and for instance when a multi-channel simulator is concerned, the blocks can be utilized for processing other channels. In a preferred embodiment, delay and amplitude data of a channel is analysed in advance before simulation, whereby the delays of components significant for the radio channel are indicated at different instants of time, and during the actual simulation the FIR blocks can be allocated to appropriate places at a delay level depicting a radio channel delay. In accordance with a second preferred embodiment, radio channel data is analysed in real time during simulation and correspondingly the decisions concerning the allocation are made in connection with the simulation. Transferring the FIR blocks at a delay axis is made, for instance, by setting a new delay value for the block.

Several advantages are achieved with the invention. During the actual simulation, the FIR blocks can be precisely allocated at appropriate places at the appropriate time. Thus, apparatus resources, which can be utilized for example in a multi-channel simulator for simulating other radio channels, are significantly saved.

BRIEF DESCRIPTION OF THE DRAWINGS

In the following the invention will be described in greater detail by means of the preferred embodiments with reference to the accompanying drawings, in which.

DETAILED DESCRIPTION OF THE PREFERRED EMBODIMENTS

Figure 1A:
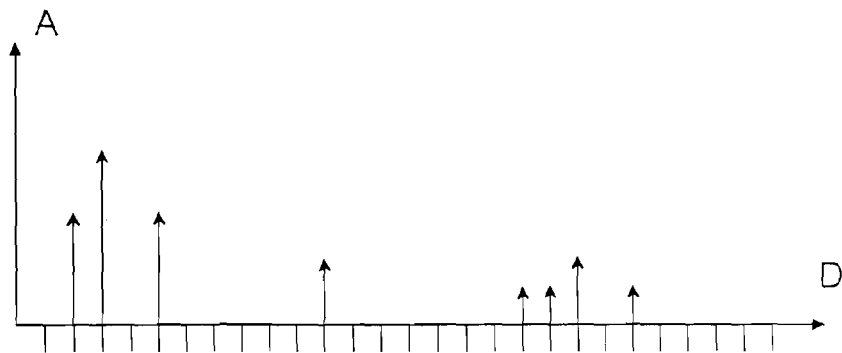
FIGS. 1A to 1B show the already explained impulse response patterns according to a channel model at two different instants of time.
Figure 1B:
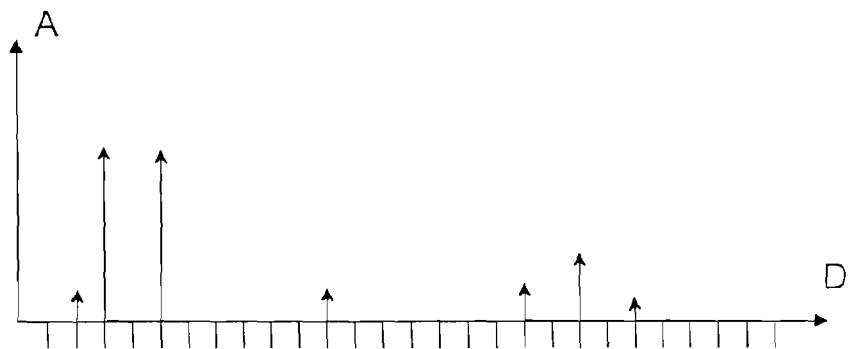
Figure 1C:
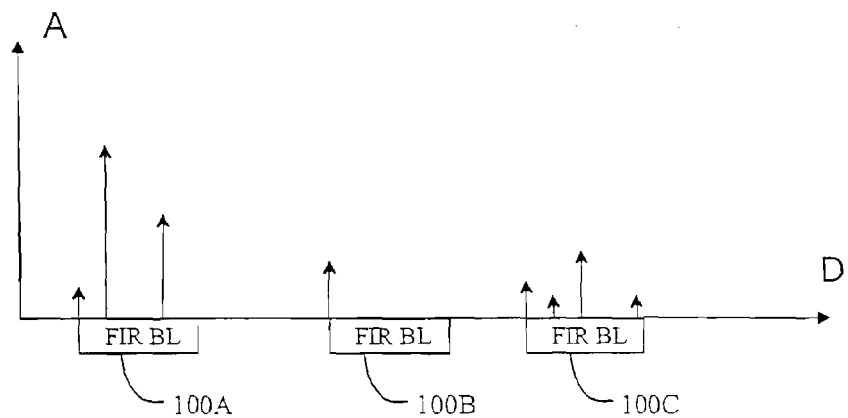
FIG. 1C shows the already explained energy mean of the impulse responses that also illustrates the allocation of FIR blocks.
Figure 2A:
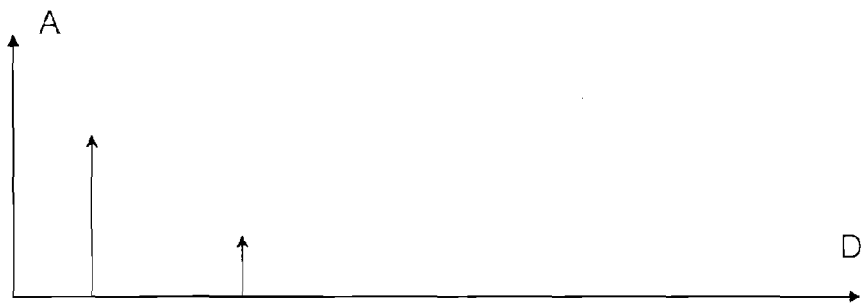
FIGS. 2A to 2B illustrate the already explained impulse response patterns showing a radio channel at two different instants of time, and in which a second tap of the impulse response is referred to as a sliding tap.
Figure 2B:
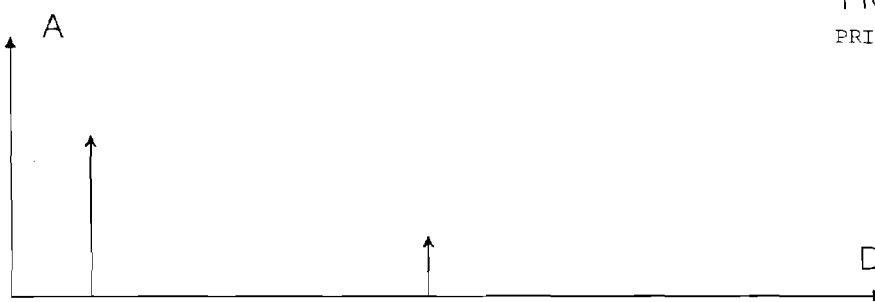
Figure 2C:
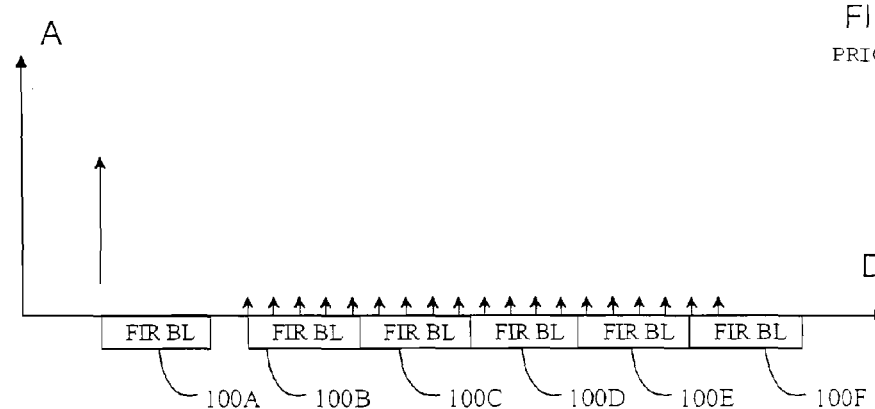
FIG. 2C shows the already explained energy mean of the impulse responses, and also illustrates the prior art allocation of FIR blocks based on the energy mean with reference to FIGS. 2A to 2B.
Figure 2D:
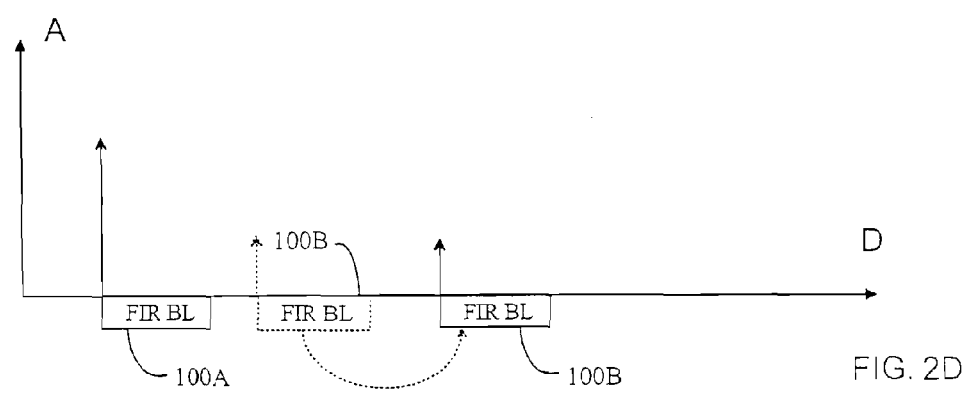
FIG. 2D shows the allocation of FIR blocks in accordance with a preferred embodiment of the invention, presenting the sliding tap shown in FIG. 2A to 2B as an example.

Let us first take a closer look at FIG. 2D that illustrates the basic idea of the invention. The channel situation shown in FIGS. 2A and 2B, meaning that between two different instants of time the channel has changed so that one tap has slid in the direction of a greater delay on the delay axis in FIG. 2B. FIG. 2D shows that a first FIR block 100A substantially remains in position at the first tap, but a second FIR block 100B is allocated from a first spot indicated by a dashed line to a second spot indicated by unbroken lines for a second instant of time. In the case of a simple channel model, for example when a tap is transferred at standard speed, the FIR block can be forwarded a predetermined delay sequence between time sequences. Preferably the data used for forming a channel is, however, analysed in advance, whereby the delays of the energy components are precisely known at the instants of time a different impulse response is formed, and the FIR blocks can be allocated into the appropriate spots on the delay axis. It is apparent that the channel model of a sliding tap is above described merely as an example. The inventive solution is naturally also applicable to other channel models, in which the delays of the taps increase and decrease even in more complicated ways as a function of time.

Figure 3:
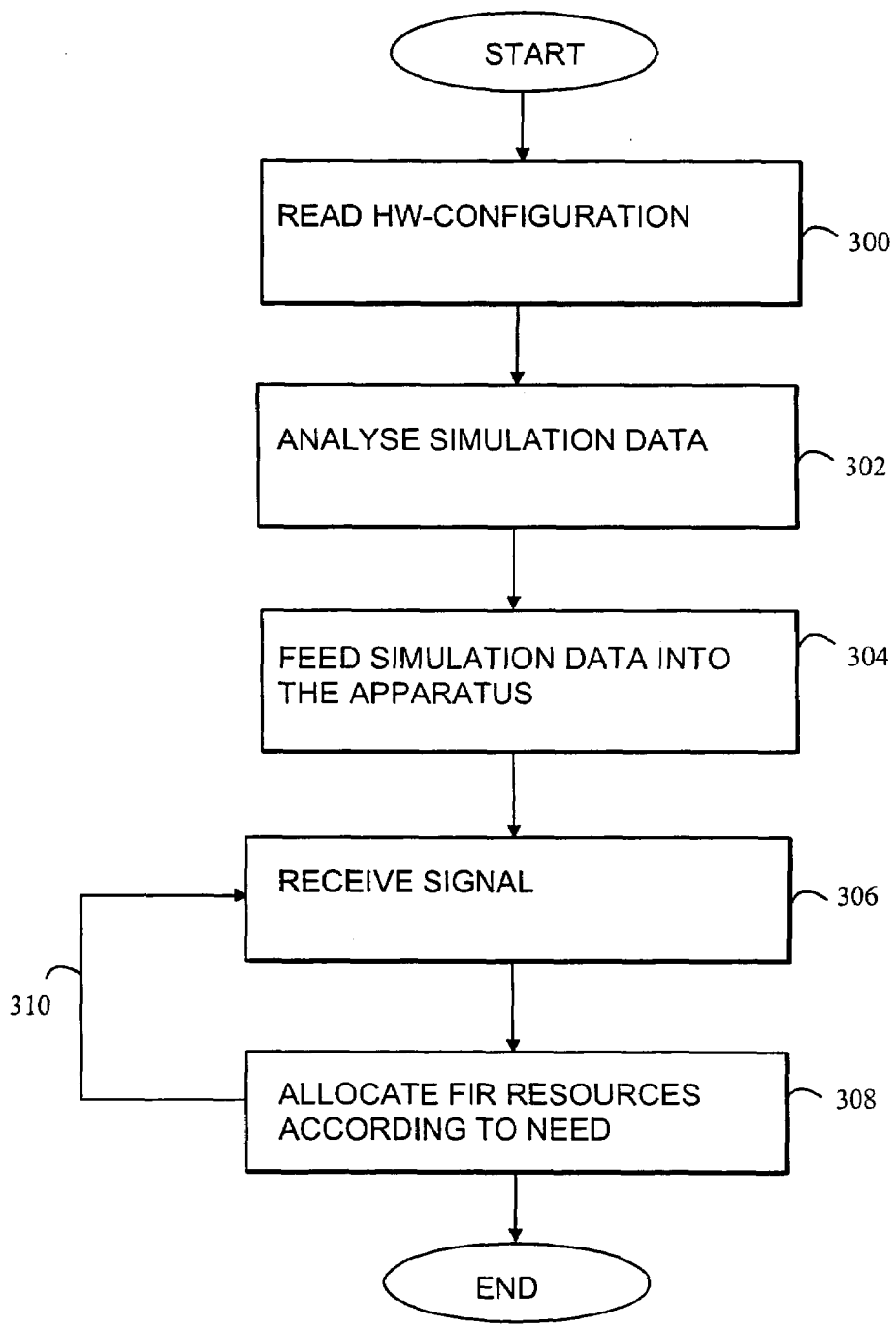
FIG. 3 shows a preferred embodiment of a method according to the invention, FIG. 4 roughly shows a multi-channel channel simulator.

FIG. 3 illustrates a preferred embodiment of the method according to the invention. In the initial step of the method, current is switched on in a channel simulator, and thereafter, in step 300, the hardware configuration is read, meaning that the control means of the apparatus check the present configuration of the apparatus. Thus, the control means know the assembly of the apparatus, referring to the modules the apparatus is built of. In addition, simulation parameters are received from the user at the start of the process. Preferably, this occurs using appropriate user interface software, a display and a keyboard. The simulation parameters typically comprise the number of transmitters, the number of receivers, the number of channels to be simulated and the properties thereof. The number of transmitters and receivers is not always the same, for instance when the test environment comprises transmission or reception diversity or possibly interfering transmitters.

In step 302, impulse responses, or radio channel data, are analysed. In this step, the entire impulse response data is checked, and the significant energy levels are localized from the data at different instants of time. As for the radio channel, the significance of data values is estimated and the criteria to be used may differ in accordance with the radio channel data. For instance, amplitude can be used as a criterion, in other words data values exceeding a particular amplitude value can be considered as significant data values. On the other hand, as regards certain radio channel models, a sample value having minor amplitude may be significant for the radio channel if the sample value is the only sample within a particular delay area. As for the radio channel, the significance of the samples can be estimated in a number of other ways than those mentioned. As a result of the analysis, information is obtained that the impulse response includes one delay component remaining substantially in position and a component moving at the delay level. In method step 304, the results of the analysis are fed into the apparatus, so that the apparatus is able to allocate during simulation the FIR blocks into the desired locations on the delay axis. Alternatively, control information can be fed into the apparatus during simulation in real time. In step 306, signal is received in the apparatus that may either be of radio or base band mode. In method step 308, the actual simulation is carried out, in which the received user data including one or more user signals is filtered using a FIR filter in order to model the signal distortion caused by the radio channel. Based on the radio channel data the FIR filter multiplies and delays by means of several FIR blocks the elements of the received user data, such as analogous samples or digital data. The FIR blocks are dynamically allocated at the delay level into the appropriate places on the basis of the analysed data formed in step 302. Method step 310 describes how the number and location of the FIR blocks may have to be changed when simulating the channel. The unnecessary FIR blocks are released and can be allocated in for instance a multi-channel simulator for the simulation of another channel. Even though steps 304, 306, 308 and 310 in method pattern 3 are described as successive steps, it is obvious that during simulation the user data and the radio channel data are continuous and substantially simultaneous processes.

Figure 4:
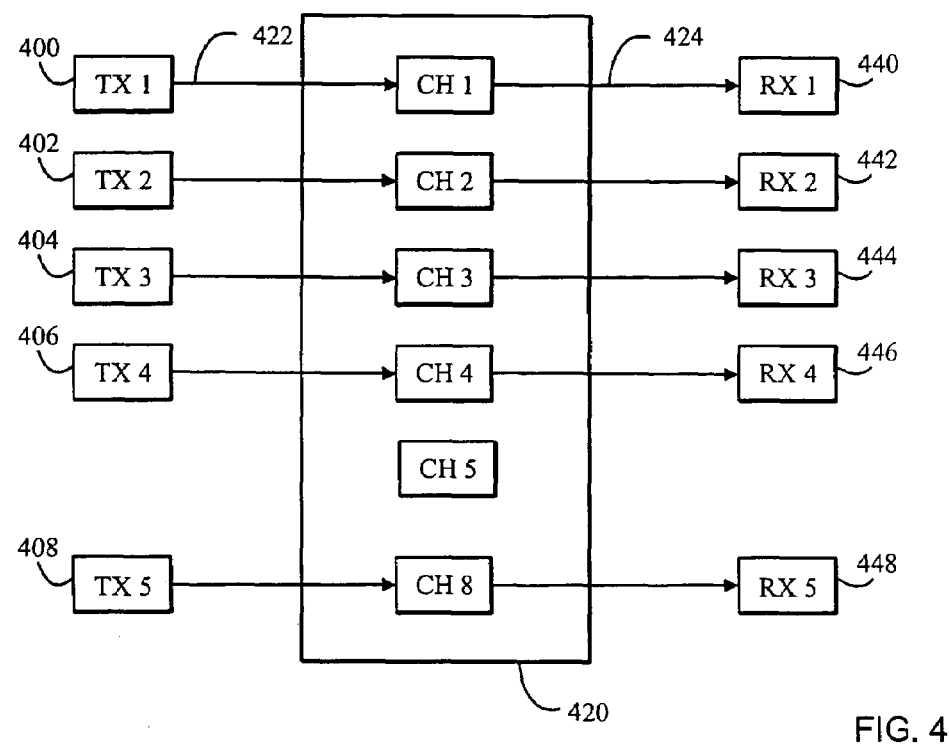

Let us next take a closer look at the preferred embodiments by means of apparatus examples. FIG. 4 shows an example illustrating the structure of a multi-channel simulator. The Figure shows a first set of apparatuses 400 to 408 and a second set of apparatuses 440 to 448 as well as a channel simulation apparatus 420. The first set of apparatuses 400 to 408 may include mobile phones connected through an antenna connector thereof to the inputs of the channel simulation apparatus 420, whereof an input 422 is numbered as an example. The second set of apparatuses 440 to 448 may in turn refer to receivers of a base station apparatus, for example, connected to the outputs of the channel simulation apparatus 420, whereof an output 424 is numbered as an example. The number of first and second apparatuses is not necessarily the same, although the example shows that the number of both apparatuses is five. The channel simulation apparatus 420 can be implemented using either radio and base band units or only base band units. In the base band units, the signal is provided with the channel fading effect, and typically implemented using the FIR filter. The desired form of the channel is achieved by changing the tap and/or delay parameters of the FIR filter. The required information for the FIR filter is formed in the simulation control unit, which controls the FIR filters and the entire operation of the simulator using a control path. The control path conveys the data concerning for example frequency parameters and amplifications for the different parts of the apparatus before simulation. The control means concerned and the other apparatus solutions implementing the method according to the invention can preferably be implemented using a processor or a computer and appropriate software. The processor can naturally be replaced with a programmable logic made up of separate components. The control means further comprise a user interface apparatus, such as a display and a keyboard, by means of which simulation parameters can be fed into the apparatus.

Typically the channel simulator apparatus 420 includes several channel elements, which all are capable of simulating and modelling desired channel types. The channel simulator apparatus shown in FIG. 4 comprises six elements. Each element comprises both a radio frequency part and a base band part, and a signal can therefore be connected to the input 422 of the channel simulator apparatus 420 either in radio frequency mode or in base band mode. In the latter case, the radio frequency parts of the channel elements are passed by. In the radio frequency part the signal can be changed into base band mode, whereafter the base band signal is applied to the base band parts, where the fading effect is added to the signal.

Figure 5:
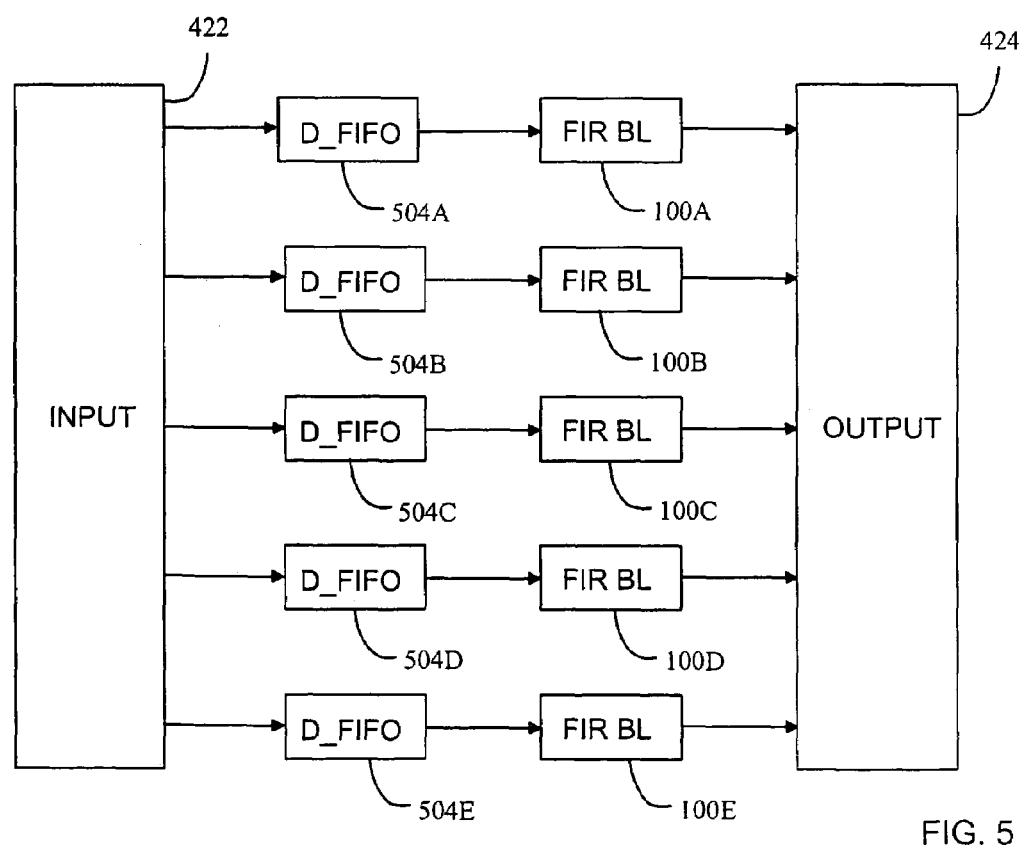
FIG. 5 illustrates a preferred embodiment of a FIR filter according to the invention, and FIG. 6 specifies the operation of a FIR block.

As regards the invention, FIG. 5 illustrates the essential parts of the apparatus to be used for simulating a channel. In accordance with what has been described in FIG. 4 the input 422 of the apparatus is either radio frequency or base band signal data. The user data, also including radio channel data, is read using the means for reading user and signal data. The input information 422 is directed to a delay unit 504A, which aims to delay the FIR block for a desired duration in such a manner that the FIR block 100A is at a desired delay spot of the tap or a tap group at the appropriate time. The delay units 504A to 504E explained in connection with method step 302 are also provided with the delay parameters created during the pre-processing of the impulse responses. The delay parameters are formed in advance or are formed during simulation using the simulator means for analysing radio channel data. Even though the Figure describes the delay unit 504A to 504E for each FIR block 100A to 100E, it is apparent that the FIR blocks can be controlled using a different number of delay units 504A to 504E. The output information of the FIR blocks 100A to 100E is summed and the signal thus formed and distorted on the channel is directed as an output 424 to the receiver apparatus. The channel simulator also includes allocation means, which are not shown in the Figure for clarity. The object of the allocation means is to allocate a necessary number of FIR blocks for use and to release the unnecessary blocks to be processed by other channels. The configured operations of the channel simulator, the means for analysing radio channel data, the means for reading user and radio channel data, the allocation means, and all other means required for the implementations of the preferred embodiments are implemented or instance by software, using separate logic components, as an ASIC or using any other known manner.

Figure 6:
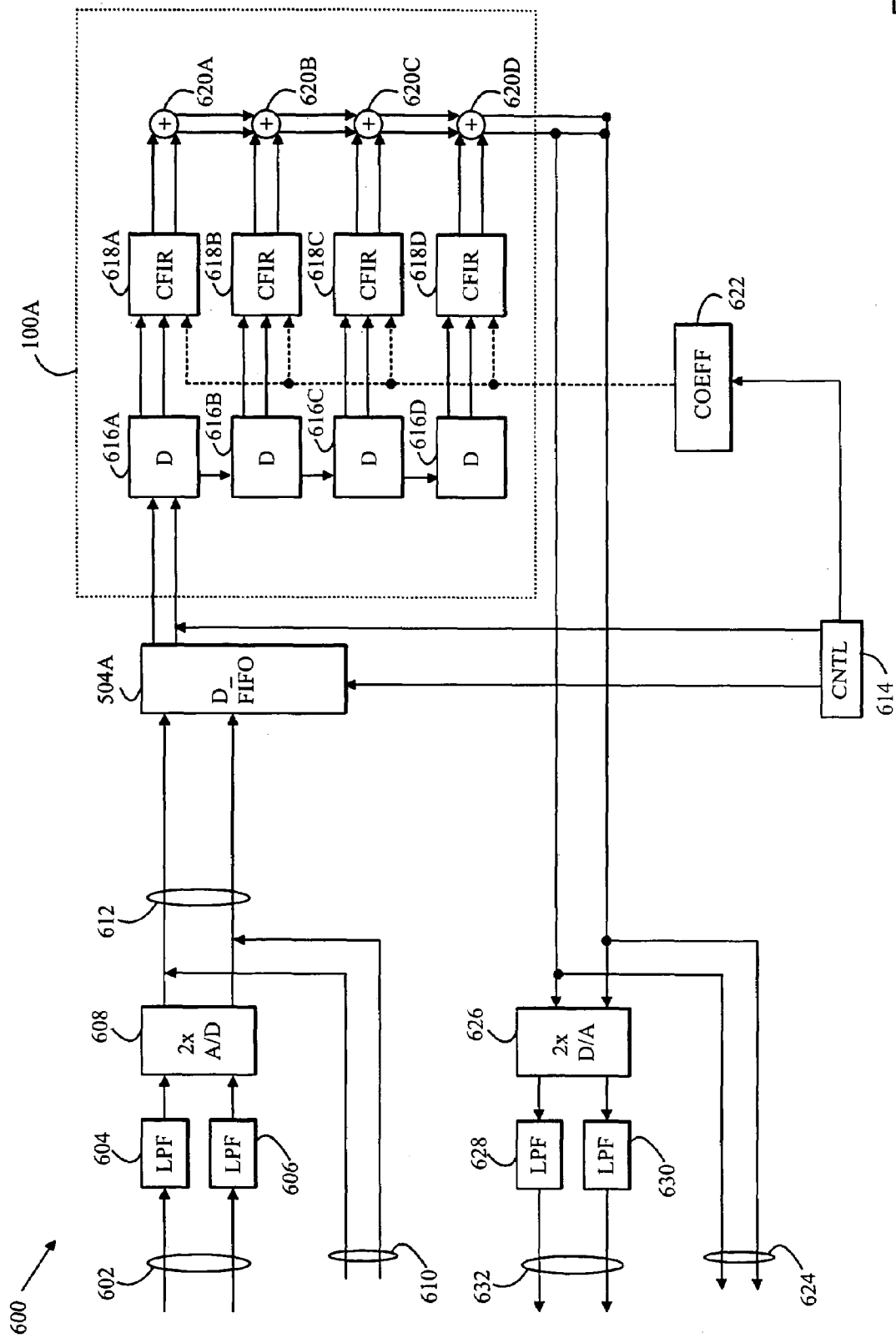

FIG. 6 specifies the structure of said base band unit 600 referred to in FIG. 4. The operation of the base band unit 600 can be divided into two different blocks, or interface blocks, comprising the input and output parts of the base band unit 600 and a digital block comprising the components required in the actual channel simulation. The interface block is provided with a transmitter signal, either in analogue mode 602 or in digital mode 610, from the radio frequency unit as an input. The signal comprises the signals of I and Q branches as separate units. The analogue inputs 602 are applied through lowpass filters 604 and 606 to an analogue/digital converter 608. The I and Q signals 612 in digital mode are then applied to the delay unit 504A of the digital block, which is also described in FIG. 5.

The operation of the delay unit 504A is controlled by means of a control unit 614, which preferably utilizes the analysing data of the channel model data for directing the FIR blocks to the required locations on the delay axis. The control unit preferably also controls delay elements 616A to 616D of the FIR block 100A. One FIR block 100A may be used to monitor a tap group including close taps in the impulse response, whereby one delay element is set to correspond to each tap in the tap group, and the delay in the delay element can be set separately. Filter elements 618A to 618D in the FIR block perform the known FIR filtering for the received signal, the FIR filtering providing the signal with the channel effect. The tap coefficients of the FIR elements 618A to 618D are supplied from the multiplication unit 622, the operation of which is controlled by the control unit 614. The outputs of the FIR elements 618A to 618D are summed together in a summer 620A to 620D. The sum is also applied to the interface block, and from there either straight out 624 in digital mode or out to radio frequency units through digital analogue converters 626 and low-pass filters 628, 630 in analogue mode 632.

Even though the invention has been described above with reference to the examples shown in the accompanying drawings, it is apparent that the invention is not restricted thereto but can be modified in various ways within the scope of the appended claims.

What is claimed is:

1. A method for simulating a radio channel, comprising:
   simulating the radio channel utilizing an user data describing a radio signal and a radio channel data describing the radio channel at different instants of time, and the simulation filtering the user data using one or more FIR blocks based on the radio channel data;
   analysing the radio channel data before using the radio channel data in the simulation for localizing significant radio channel taps at different instants of time;
   reallocating at least one of the FIR blocks dynamically at a delay level depicting a radio channel delay during simulation in such a manner that the FIR blocks cover the localized significant radio channel taps; and
   allocating only a number of required FIR blocks for the simulation at each instant of time, and releasing a number of unused FIR blocks from use.

2. A method as claimed in claim 1, wherein a FIFO delay parameter is used to set the delay of the FIR block for reallocating the block at the delay level.

3. A radio channel simulator comprising:

means for reading radio channel data describing a radio channel and user data comprising at least one user signal;

one or more FIR blocks for simulating the radio channel, the one or more FIR blocks for filtering the user data read based on the radio channel data in connection with the simulation;

means for analysing the radio channel data before using the radio channel data in the simulation for localizing significant radio channel taps at different instants of time; and allocation means for allocating said one or more FIR blocks for filtering purposes, the allocation means being arranged to reallocate at least one FIR block dynamically at a delay level depicting a radio channel delay during simulation in such a manner that one or more FIR blocks cover the localized significant radio channel taps, the allocation means being arranged to employ an appropriate number of FIR blocks at each instant of time used for simulation and to release those FIR blocks, which are not required at said instant of time.

4. A radio channel simulator as claimed in claim 3, wherein the allocation means is arranged to reallocate the FIR block at the delay level by setting a FIFO delay parameter.

5. A radio channel simulator, configured to:

read radio channel data describing a radio channel and an user data comprising at least one user signal;

simulate the radio channel using one or more FIR blocks for filtering the user data read based on the radio channel data in connection with the simulation;

analyse the radio channel data before using the radio channel data in the simulation for localizing significant radio channel taps at different instants of time; and reallocate at least one FIR block dynamically at a delay level depicting a radio channel delay during simulation in such a manner that one or more FIR blocks cover the localized significant radio channel taps, the radio channel simulator being configured to employ an appropriate number of FIR blocks at each instant of time used for simulation and to release those FIR blocks, which are not required at said instant of time.

6. A radio channel simulator as claimed in claim 5, wherein the radio channel simulator is configured to reallocate the FIR block at the delay level by setting a FIFO delay parameter.

\* \* \* \* \*

UNITED STATES PATENT AND TRADEMARK OFFICE
CERTIFICATE OF CORRECTION

PATENT NO. : 7,394,880 B2
APPLICATION NO. : 10/853789
DATED : July 1, 2008
INVENTOR(S) : Kemppainen et al.

It is certified that error appears in the above-identified patent and that said Letters Patent is hereby corrected as shown below:

ON TITLE PAGE:

Item (73)   Assignee: now reads "JOT Automation Oy, Oulunsalo (FI)"

should read --Elektrobit SystemTest Oy, Oulunsalo (FI)--.

Signed and Sealed this

Second Day of December, 2008

JON W. DUDAS
*Director of the United States Patent and Trademark Office*